United States Patent
Hamidi-Sepehr et al.

(10) Patent No.: US 11,877,268 B2
(45) Date of Patent: Jan. 16, 2024

(54) STREAMLINING PROTOCOL LAYERS PROCESSING, AND SLOTLESS OPERATION

(71) Applicant: Intel Corporation, Santa Clara, CA (US)

(72) Inventors: Fatemeh Hamidi-Sepehr, San Jose, CA (US); Murali Narasimha, Lake Oswego, OR (US); Yujian Zhang, Beijing (CN); Mustafa Emara, Munich (DE); Qian Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 17/395,725

(22) Filed: Aug. 6, 2021

(65) Prior Publication Data

US 2021/0368501 A1     Nov. 25, 2021

Related U.S. Application Data

(60) Provisional application No. 63/062,284, filed on Aug. 6, 2020.

(51) Int. Cl.
*H04L 5/00*     (2006.01)
*H04W 72/0446*     (2023.01)
*H04W 72/21*     (2023.01)

(52) U.S. Cl.
CPC ....... *H04W 72/0446* (2013.01); *H04L 5/0044* (2013.01); *H04L 5/0048* (2013.01); *H04W 72/21* (2023.01)

(58) Field of Classification Search
CPC . H04W 72/0446; H04W 72/21; H04W 72/23; H04W 28/0278; H04W 28/0273; H04L 5/0044; H04L 5/0048; H04L 5/0053
See application file for complete search history.

(56) References Cited

FOREIGN PATENT DOCUMENTS

| EP | 3397015 A1 | * | 10/2018 | ........ H04W 28/0278 |
| WO | WO-2017194673 A1 | * | 11/2017 | ........... H04L 1/0007 |
| WO | WO-2018127620 A1 | * | 7/2018 | ........... H04L 1/1642 |

* cited by examiner

*Primary Examiner* — Thai Nguyen
(74) *Attorney, Agent, or Firm* — Schwegman Lundberg & Woessner, P.A.

(57) ABSTRACT

A computer-readable storage medium that stores instructions for execution by one or more processors of a UE. The instructions to configure the UE for a streamlined transmission during low latency communications in a wireless network and to cause the UE to decode configuration signaling from a base station. The configuration signaling configures SR occasions for the UE. The UE detects availability of a UL data packet from an application layer, a size of the UL data packet being higher than a size of a TTI associated with a pre-defined slot boundary. An SR is encoded for transmission during one of the SR occasions, the SR including an indication based on the size. Control information is decoded in response to the SR, the control information including a scheduling grant based on the size of the UL data packet. The UL data packet is encoded for transmission using the scheduling grant.

20 Claims, 10 Drawing Sheets

STREAMLINING PROTOCOL LAYERS PROCESSING, AND SLOTLESS OPERATION

PRIORITY CLAIM

This application claims the benefit of priority under 35 U.S.C. 119(e) to U.S. Provisional Patent Application Ser. No. 63/062,284, filed Aug. 6, 2020, and entitled "SYSTEM AND METHODS OF STREAMLINING PROTOCOL LAYERS PROCESSING, AND SLOT-LESS OPERATION," which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to systems and methods for streamlining protocol layers processing and slotless operation.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE and NR systems in the licensed, as well as unlicensed spectrum, is expected in future releases and 5G (and beyond) communication systems. Such enhanced operations can include techniques for streamlining protocol layers processing and slotless operation.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
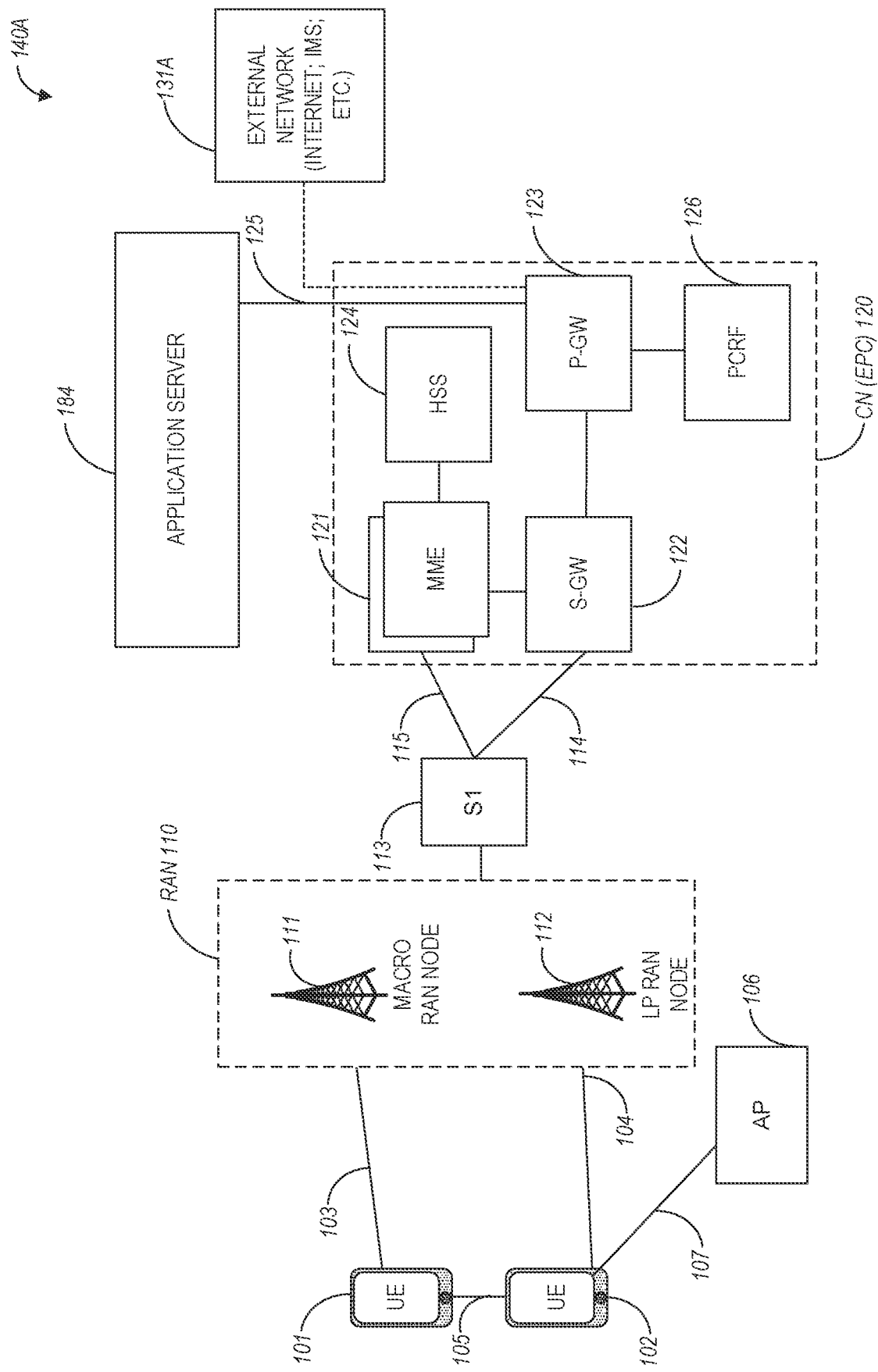
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs). NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
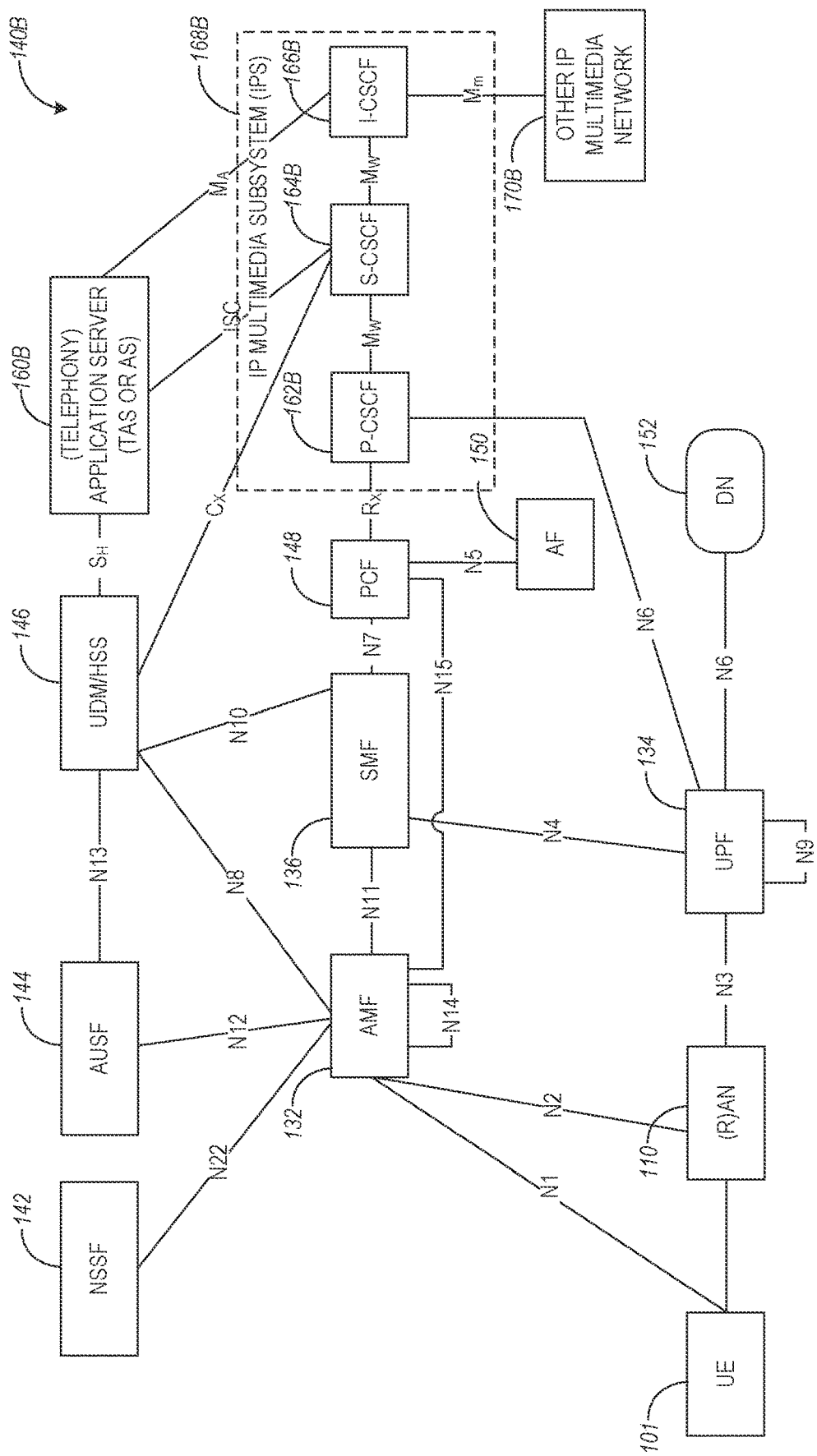
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically. UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown). N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
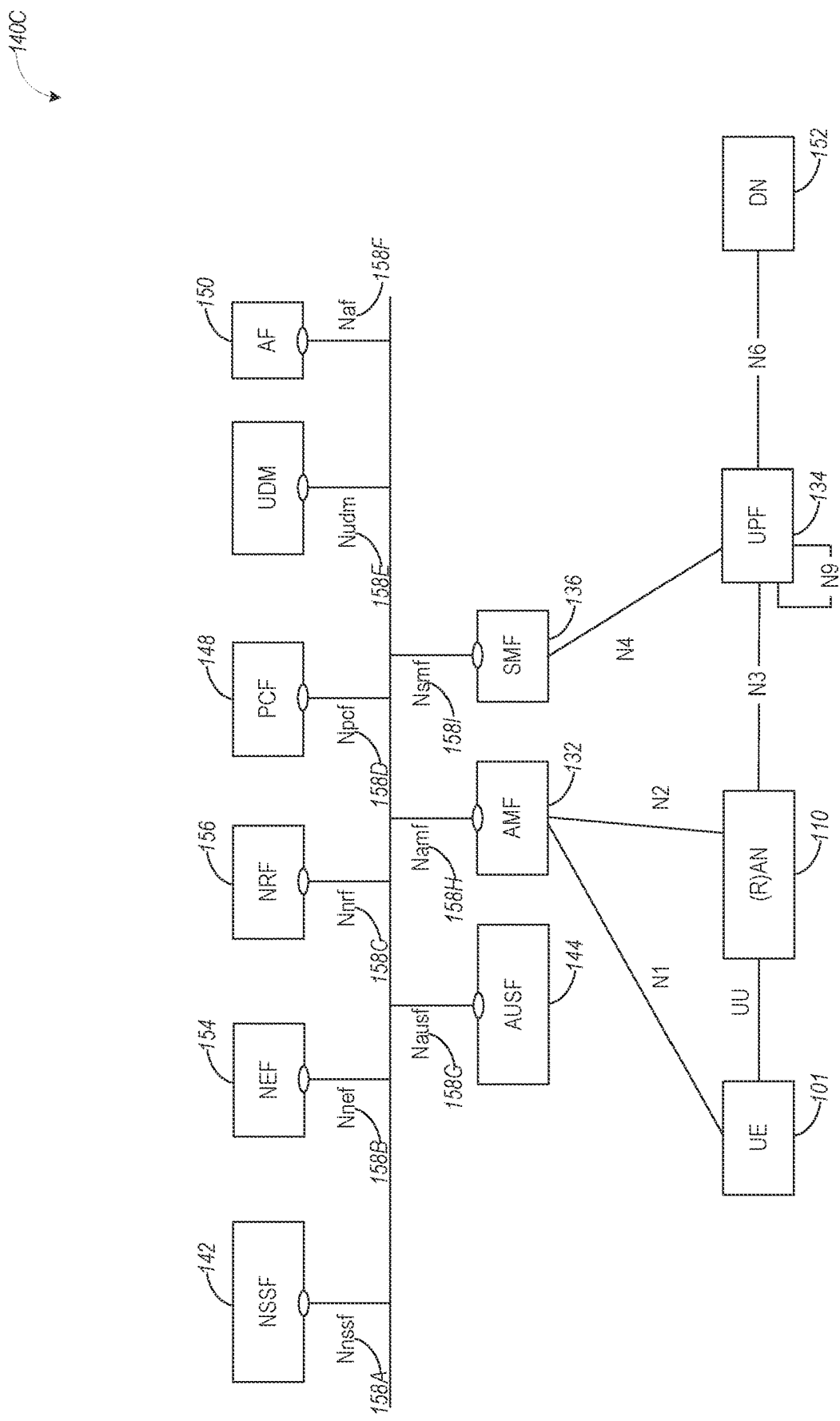

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
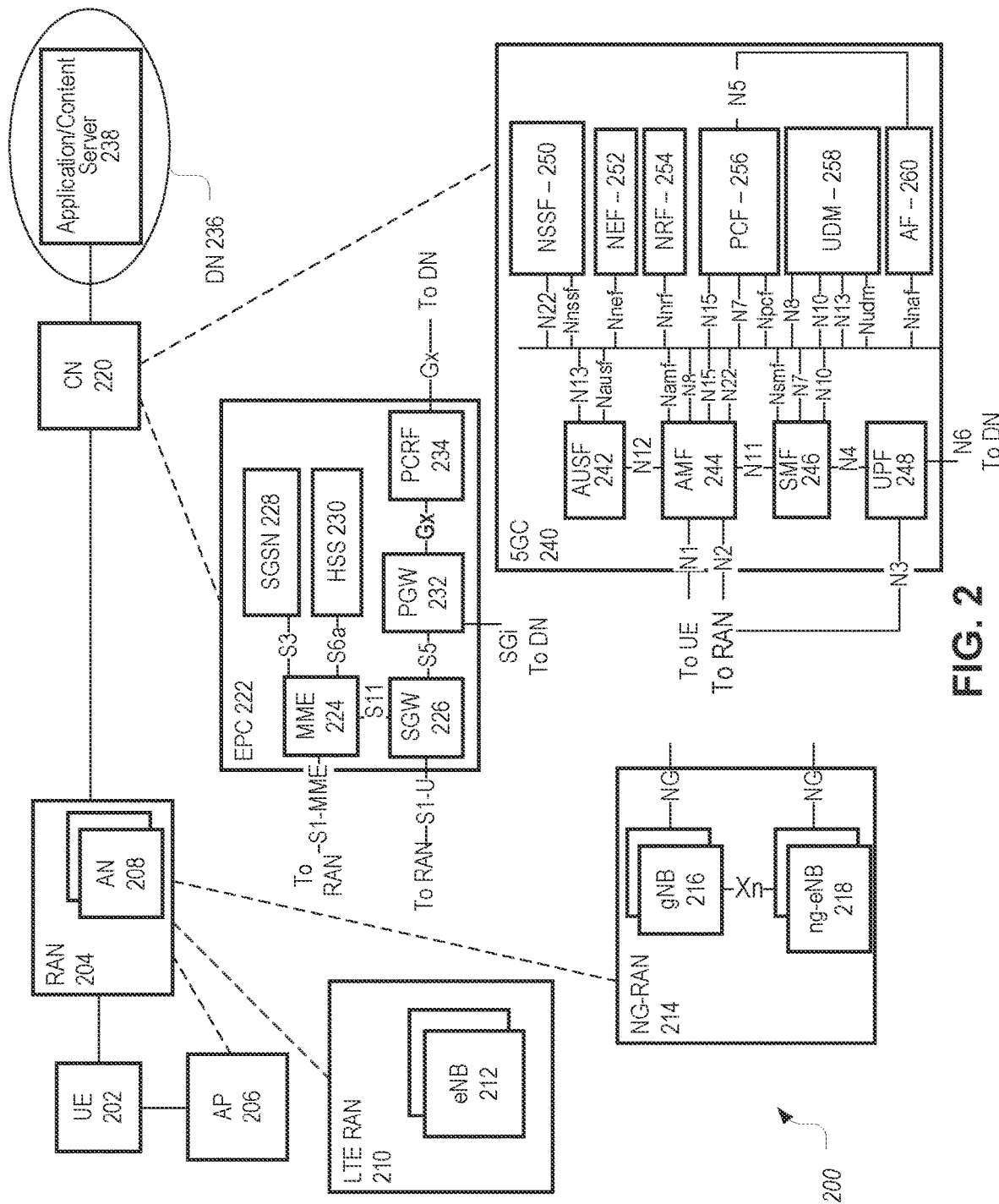
FIG. 2, FIG. 3, and FIG. 4 illustrate various systems, devices, and components that may implement aspects of disclosed embodiments.
Figure 3:
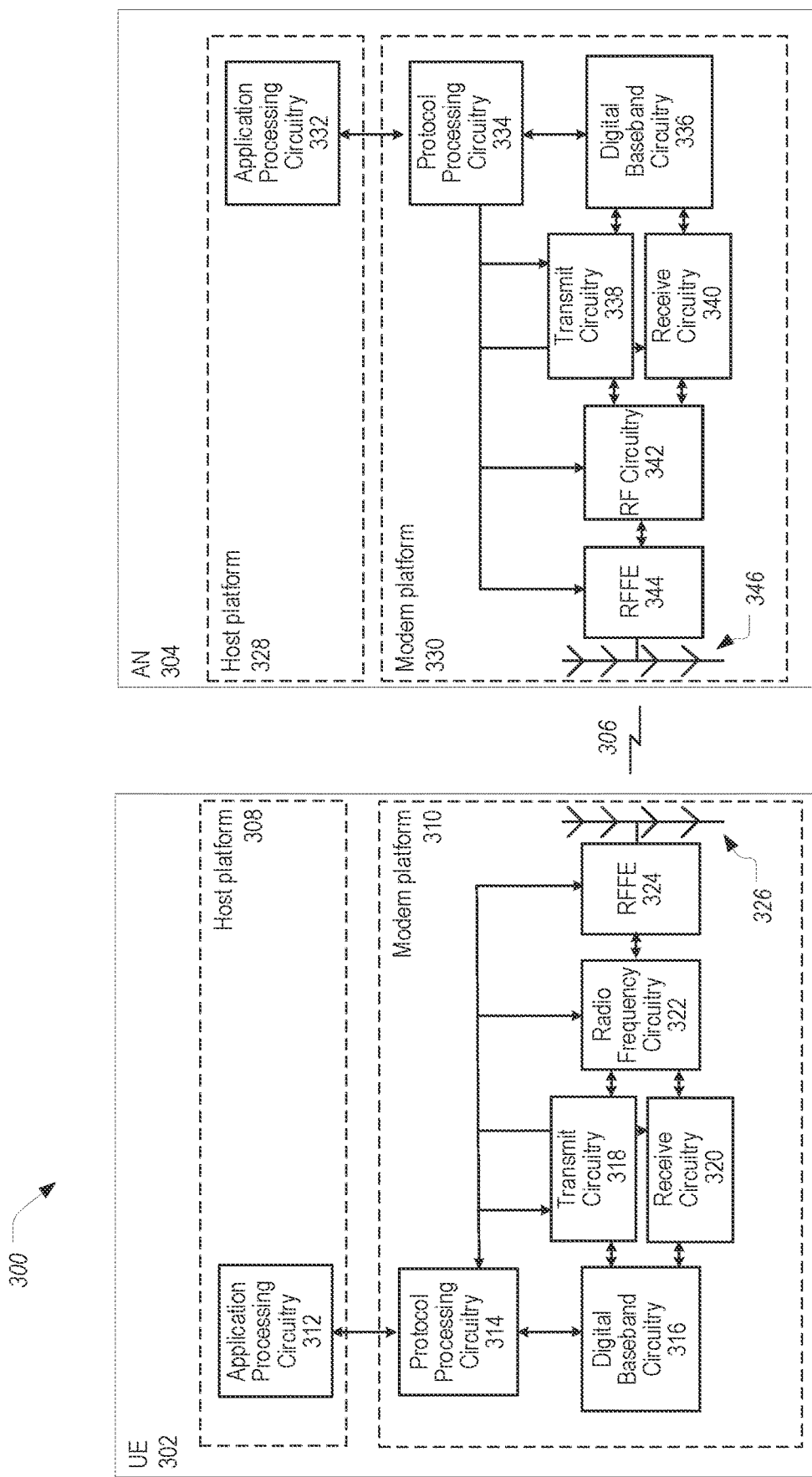
Figure 4:
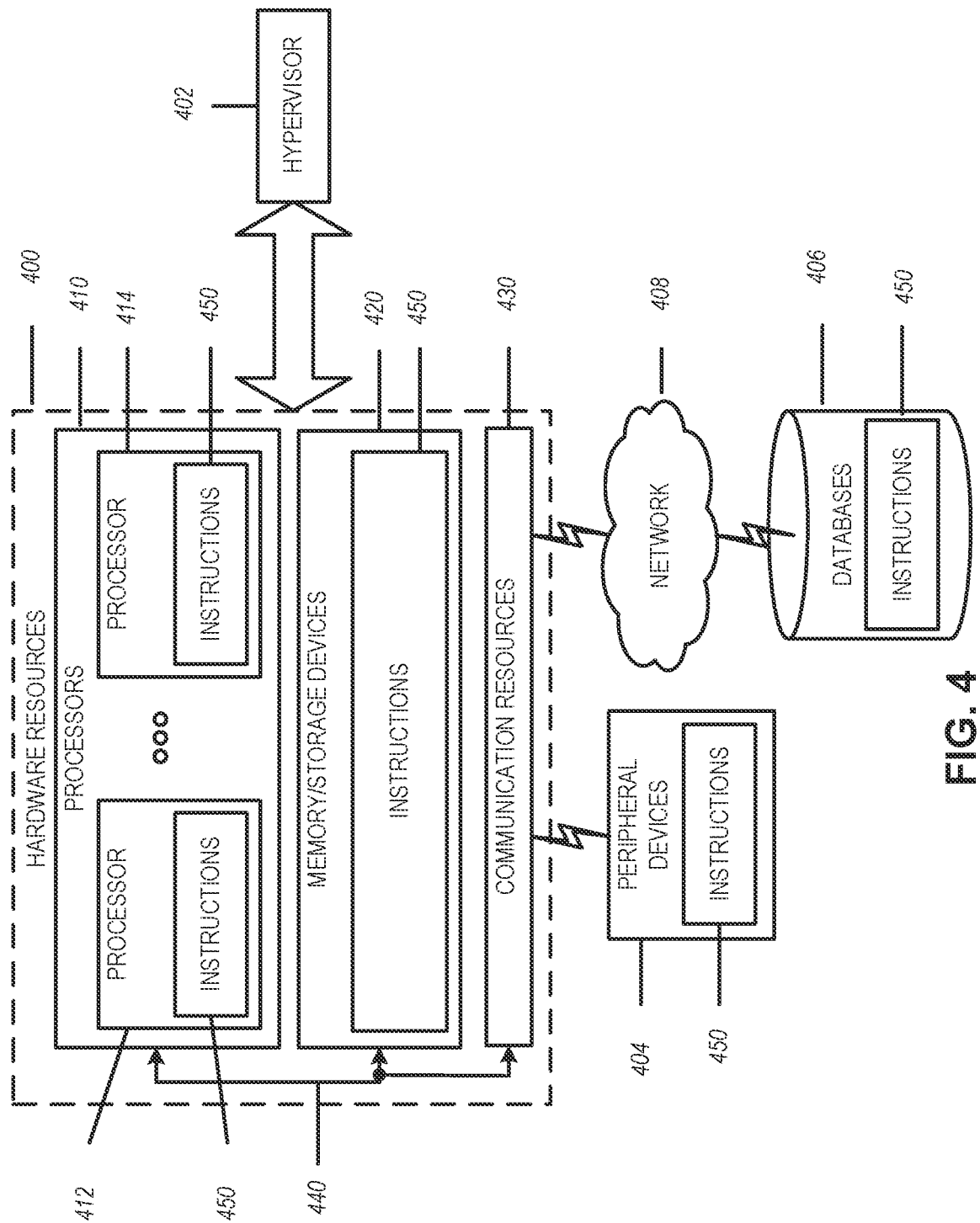

FIG. 2, FIG. 3, and FIG. 4 illustrate various systems, devices, and components that may implement aspects of disclosed embodiments. More specifically, UEs and/or base stations (such as gNBs) discussed in connection with FIGS. 1A-4 can be configured to perform the disclosed techniques.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as but not limited to, PSBCH, PSDCH, PSSCH. PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like.

Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks, PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows.

The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving to the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant for policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations.

The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically. FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The term "application" may refer to a complete and deployable package, environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

Mobile communications have evolved significantly from early voice systems to today's highly sophisticated integrated communication platforms. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR evolves based on 3GPP LTE-Advanced with additional potential new Radio Access Technologies (RATs) to enrich people's lives with better, simple, and seamless wireless connectivity solutions. NR may enable wireless communications and deliver fast, rich content and services.

Ultra-Reliable Low Latency Communication (URLLC) operation in NR targets low latency and high reliability. To achieve low latency, NR provides the following functionalities: short slot lengths (via larger sub-carrier spacing (SCS) at higher frequencies); data transmission in durations shorter than a slot (mini-slots as short as 2 symbols in downlink (DL)); flexible time-division duplex (TDD) slot structure (a slot containing both DL and uplink (UL) symbols); pre-emption of eMBB data (ongoing DL eMBB data transmission can be punctured by uRLLC data); semi-persistent scheduling (SPS)—preconfigured resources eliminating the need to perform PDCCH decoding and, additionally, for uplink, configured grants can be used to reduce the need for scheduling requests; frequent PDCCH transmission opportunities and monitoring capabilities; short PUCCH (one or two symbol PUCCH to minimize HARQ feedback delay); frequent scheduling request (SR)-UEs can be configured with scheduling request occasions as often as 2 symbols, to minimize delay for uplink resource allocation; retransmission without HARQ feedback (configuration can enable 2, 4, or 8 repetitions without waiting for HARQ feedback); front-loaded demodulation reference signal (DMRS) (e.g., using DMRS early in the slot to enable early channel estimation); and frequency first mapping of data to resource elements to allow symbol by symbol processing (rather than buffering all symbols of slot).

In some aspects, the above functionalities allow NR to achieve a 1 msec user plane (UP) latency. For next generation technologies, the goal is to significantly reduce the latency compared to what is achievable in NR (e.g., about 10× reduction). Generally, the lowest achieved latency is realized in favorable radio conditions (i.e., when no HARQ or ARQ retransmissions are needed and a single shot transmission is adequate). Furthermore, an additional source of user plane latency is the segmentation of packets, which imposes additional processing time. Therefore, to minimize the user plane latency to meet the targeted URLLC requirements, new packet processing techniques may be used to minimize or completely avoid the segmentation processes.

Current wireless technologies, such as LTE and NR systems, decouple the concepts of a transport block (TB) and packet data convergence protocol (PDCP) service data unit (SDU). Segmentation, concatenation, and padding operations are supported in the Access Stratum (AS) protocol to fit/map PDCP SDU to a transport bock (TB) (not necessarily one-to-one mapping between the two).

Figure 5:
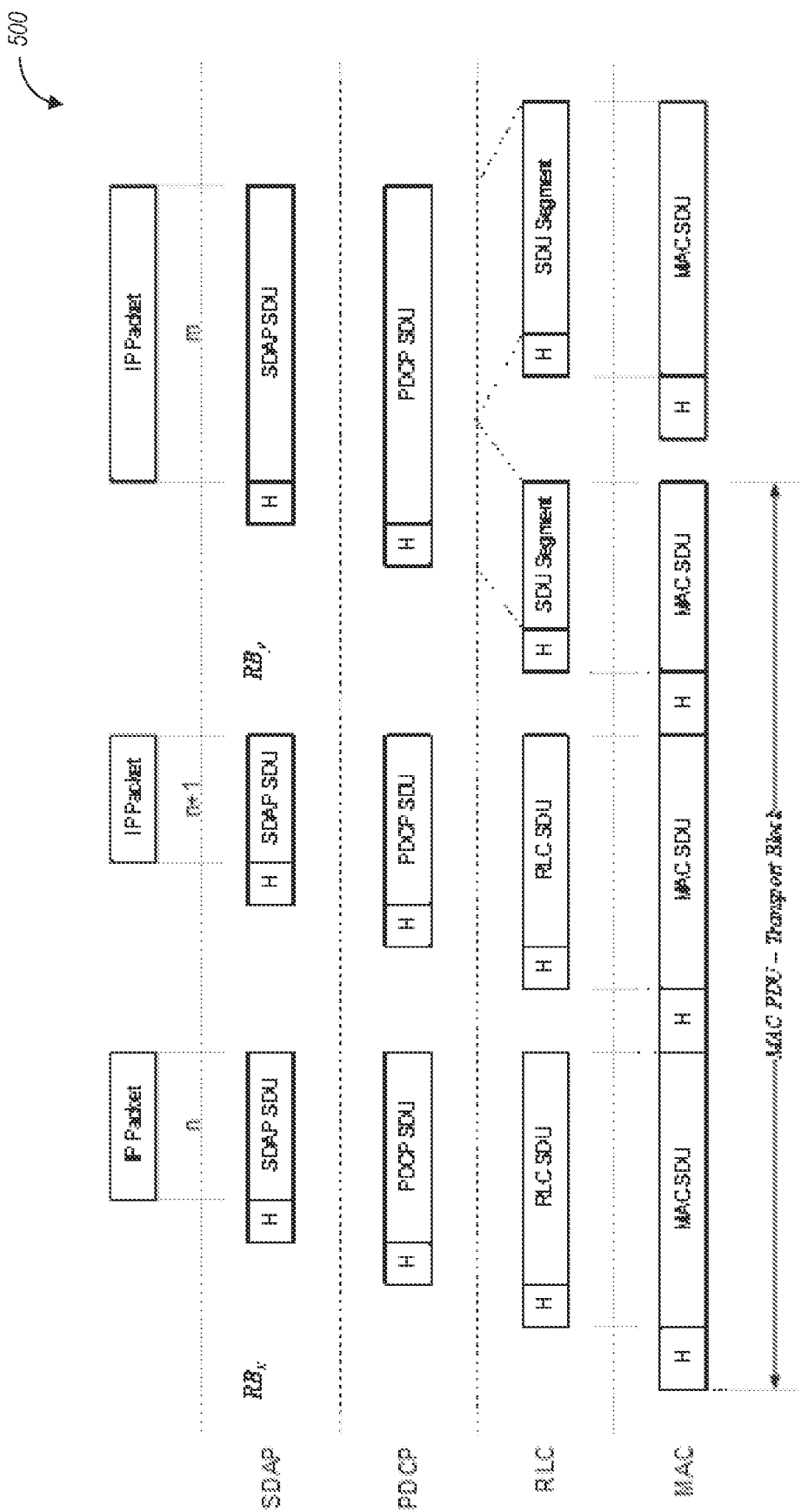
FIG. 5 illustrates NR Layer 2 (L2) protocol data unit (PDU) data flow, according to some example embodiments.

FIG. 5 illustrates NR Layer 2 (L2) protocol data unit (PDU) data flow 500, according to some example embodiments.

In one Media Access Control (MAC) protocol data unit (PDU) (i.e., a TB), there can be MAC SDUs from multiple Radio Bearers (RBs). In general, there is no guarantee that one L3 packet will always be contained in one MAC PDU. For example, as shown in FIG. 5 (which illustrates an example of NR L2 PDU data flow), the last IP packet is transmitted in two MAC PDUs. The receiver side of the RLC layer will wait for all SDU segments of one RLC SDU before delivering the re-assembled RLC SDU to the PDCP layer, which causes additional latency.

Generally, if the higher-layers packet (L3 packet) is too large to fit into one TB allocation (PHY allocation by gNB), segmentation is required. Consequently, a single higher-layer packet will be transmitted over multiple TBs, which can result in increased processing time across the protocol layers, which is may not be desired for latency-critical services.

The disclosed techniques enable transmission of one higher-layer packet into one transmission time interval (TTI) without segmentation and/or considerations with respect to fitting the transmission into multiple transport blocks (TBs). In particular, the proposed techniques for latency-critical traffic may be used to avoid segmentation of PDCP SDU (i.e., L3 packet), and to ensure that one L3 packet can be transmitted in one shot/TTI. The disclosed technique may enable streamlining the protocol layers' processing, which in turn reduces the UP latency. Particularly, the proposed techniques enable one-to-one mapping of protocol layers' packets, by mapping the L3 packet to a single PDCP PDU, then to a single RLC PDU, then to one or multiple MAC PDU(s) (assuming CB-level feedback), and then transmit it over one TTI. As such, one-shot processing across the protocol layers is made possible. By mapping one TB (one TTI) to one L3 packet, L2 processing time can be reduced (e.g., via pre-population of L2 headers, etc.), while the exact amount of reduction may to some extent depend on the implementation.

(A) High-Level Summary of the Approaches Discussed Herein

In some embodiments, to achieve alignment of a Layer 3, or upper layer, (L3) packet (e.g., an application layer packet) within one TTI, the disclosed bottom-top approaches may be used (e.g., adjusting upper-layer packet size based on PHY resource allocation).

The disclosed techniques also provide top-bottom mechanisms (e.g., under Approach 3) (e.g., by adjusting PHY resources based on the upper-layer (L3) packet size). Such approaches may consider associating the (maximum) packet size of the higher layer to the maximum supported data rate or TBS over the physical layer air interface.

Considering the bottom-top approaches, higher-layer packet size(s) can be designed/selected in coordination with PHY TBS to ensure fitting into one PHY TB. This can be enabled semi-statically (e.g., by fixed/pre-defined/pre-configured packet or TBS size(s)) as in Approach 1, or more dynamically (e.g., through some feedback/indication mechanism from lower layers to higher layers) as in Approach 2.

(B) Approach 1: Fixed/Known Upper-Layer Packet Size

In some embodiments, if the upper layer packet size is fixed and known apriori, techniques to ensure the packet fits into one TB may be used. For example, VoLTE uses resources allocated periodically for fixed-size packets. Additionally, SPS techniques can be used.

In NR Rel-16 URLLC UL Configured Grant (CG), it may be assumed that the gNB is aware of the traffic pattern (periodicity and timing offset) as well as the IP packet size (i.e., the message size of each traffic flow is known at the gNB), and can accordingly (pre-)configure resources, with proper TB size to hold one IP packet without segmentation in L2.

Similarly, if the packet size from the upper layers is (designed to be) fixed and known (or from a set of few known/fixed sizes), (e.g., through non-IP transport design of the network, etc.), the physical resources can then be (pre-) allocated properly by gNB to enable transmission of one L3 data packet in one shot/TTI.

In one embodiment, slot-less operation (i.e., flexible slot operation where scheduling/TTI duration can be flexible in terms of the number of symbols) can be adopted to accommodate both small or large (e.g., even too large to fit into a conventional slot duration) fixed upper-layer packet size within one TTI.

While the slot-less operation can be beneficial under Approach 1 as disclosed above, the main benefits from slot-less (flexible slot) operation can be revealed under Approach 3 as discussed herein.

In some embodiments, if a higher-layer packet is of varying size (not fixed/known), from a physical layer perspective, the gNB may not know what resources need to be allocated to the UE so that one higher layer packet can be mapped to a single TB/CB.

(C) Approach 2: Adjusted Higher Layer Packet Sizes Based on Signaling from Access-Stratum (AS) Layer to Higher Layer In one embodiment, the higher-layer (e.g., L3) packet size(s) can be designed/selected in coordination with PHY TBS/TTI and/or air interface data-rate, to ensure fitting one L3 packet into one PHY TB/TTI (bottom-top approach). In an extended embodiment, to enable/facilitate the coordination, some feedback mechanism from the AS layer is introduced. Particularly, through some exchange of information between the AS and higher layers, the higher layer (L3) sets its packet size depending on the radio scheduler (gNB) decisions (e.g., scheduled and available time/frequency resources).

In some embodiments, for both UL and DL transmissions, the gNB is responsible for making the scheduling and resource allocation decisions at the air interface. On the other hand, the UE may be the actual communication peer, while the gNB may only be a hop in the communication. Particularly, the gNB may be transparent to the application data, and may not have an application layer to perform any negotiation with higher layers. As such, in one embodiment, the gNB may inform the UE about the scheduling decisions, TBS, air interface data rate, etc., in both UL and DL cases.

In some embodiments, for DL traffic, based on the bandwidth, data-rate, and time-domain allocation (e.g., number of symbols), UE's upper layer may convey information regarding the desirable DL packet size (to fit into one transmission) to the upper layer of its communication peer for further adjustment. In another extended embodiment, for UL traffic, the UE's upper layer may change the packet size based on the information and scheduling decisions indicated by the gNB.

Alternatively, a maximum allowable TBS or a recommended maximum data rate can be communicated to the higher layers (e.g., L3 layer), so that the higher layer accordingly adjusts the packet size to avoid segmentation.

In this regard, Approach 2 may enable transmitting one L3 packet in one TTI, while the L3 packet size may not be fixed and/or pre-defined (as it was in Approach 1).

(D) Considerations with Respect to Approaches 1 and 2 (Bottom-Top Approaches)

One general consideration with respect to the bottom-top approaches is that the ultimate target of the reduced-latency 6G system design is to reduce the end-to-end latency from communication peers' perspective, and not only from the air interface perspective. Given that different applications may generate different packet sizes at different times, it might not be desirable to artificially segment the higher layers' packets to fit into the available resources in the air interface. From the end-to-end latency perspective, segmentation in the application layer might have similar latency as segmentation in the air interface. On the other hand, limiting the higher layer packet sizes (e.g., to fit into AS layer resources without segmentation) would limit which applications are eligible to use such scheme, which may not be desirable.

From a broader perspective, the L3 packet size may be determined based on the capability of all the hops between the communication peers. For example, the TCP connection may not terminate in the RAN, and TCP IP packets can be routed out of the 3GPP network to the IP network, and such multi-hop consideration cannot be addressed by the 3GPP domain, regardless of how the 3GPP system is designed. Consequently, if one IP hop/router is not able to support a certain IP packet size and requires segmentation, then the overall latency is impacted. As such, determining/adjusting the upper layer packet size based on PHY/AS layer information may not be generally feasible.

On the other hand, it is noted that one of the 6G use cases with extremely low latency requirements is to enable computing inside the 3GPP network (transportation of computing workloads in the upper layers). Accordingly, the corresponding L3/L4 layers (counterpart functionality of conventional application layer) may reside within the 3GPP network. Then, for the particular low-latency traffic of interest, the packets terminate within the 3GPP network. As such, the 3GPP domain may be able to control how the higher layers frame their packets, e.g., based on some lower-layer (L1/L2) feedback mechanism as in Approach 2.

Based on the above discussions, the top-bottom approach (Approach 3 as will be disclosed next) may be more feasible and favorable from the overall system design perspective, since it does not impose a constraint on the higher layers. In addition to RAN/AS adjustments offered by Approach 3, if it is still deemed necessary to adjust higher layer packet size, in one embodiment, some combination of Approach 3 and Approach 2 (or another combination of disclosed approaches) may be considered.

(E) Approach 3: Adjustment of Physical Resources in the AS Layer to Fit One Higher Layer Packet into One TTI In one embodiment, the L3 packet is not of known/fixed size, and AS layer does not impose any restriction to higher layer packet size either (i.e., there is no indication from lower layers in terms of PHY resources, max allowed TBS, max recommended data-rate, etc.). However, the PHY layer may make adjustments to accommodate one L3 packet within one TTI (top-bottom approaches). Particularly, the AS layer is responsible for handling the variable L3 packet size and ensuring the transmission of the higher-layer packet without segmentation. In this regard, different possibilities can be considered.

For example, in some embodiments associated with UL transmission, the maximum air interface data rate and/or TBS may be optimized based on UE's information on UL data, which can be indicated in control information (e.g., UCI), etc.

In some embodiments, the signaling to control the transmissions of user data at the radio interface can be provided by the RRC layer, the MAC layer, or the Physical layer in the AS. Compared to the signaling provided by the MAC layer (i.e., MAC Control Elements or MAC CE) and signaling provided by the Physical layer (i.e., control channel), the RRC layer signaling (i.e., RRC messages) has a more static nature.

In the disclosed design, depending on the particular information exchange required in the AS level, different types of control signaling may be considered.

In some embodiments, when the higher layer's packet is smaller than the physical resources (e.g., in one TB) in UL/DL, it is possible to achieve any alignment through MAC/PHY layer padding. A more challenging case which is the focus of the current disclosed approach (e.g., Approach 3), happens when the higher-layer packet size becomes relatively large, and adaptations in terms of the resources are required to fit the higher-layer packet within one TTI.

(E.1) Slot-Less Transmission (Extended Slot/Extended TTI Duration) to Facilitate Approach 3

In some embodiments, a variant of Approach 3 may include slot-less operation to facilitate the physical resource adjustment.

Under slot-less operation, there is no concept of slot boundary and the transmission can occur over a different number of symbols. As such, scheduling duration can be flexible in terms of the number of symbols, while an extended period of scheduling longer than the current NR slot duration is also possible.

Slot-less operation is different from the concepts of Rel-15 slot-aggregation and Rel-16 mini-slot repetition. The main goal in NR slot-aggregation is to schedule and accommodate transmission of repeated TBs (as copies of the same information) to provide higher reliability/coverage, for which Rel-16 offers a more optimized solution.

In one embodiment, flexible and extended transmission duration is enabled via slot-less transmission, to allow the AS layer to adapt to the higher-layer packet size and accommodate it within one TTI.

Due to the flexibility in determining the TTI duration (especially the longer TTI durations) offered by slot-less operation, the transmission of higher-layer packets over one TTI without segmentation and breaking into multiple different TTIs can be better supported. Particularly. TTI duration can be dynamically varying/extended depending on the upper-layer packet/PDU (variable) size, to fit it into one TTI.

Depending on UL or DL transmission directions, separate considerations need to be taken into account in this regard, as discussed herein.

(E.2) UL Transmission; UE-Assisted UL Resource Allocation and Slot-Less Operation In current technologies, all the scheduling and resource allocation decisions for both UL and DL are made by the gNB (e.g., the scheduler illustrated in FIG. 6).

Figure 6:
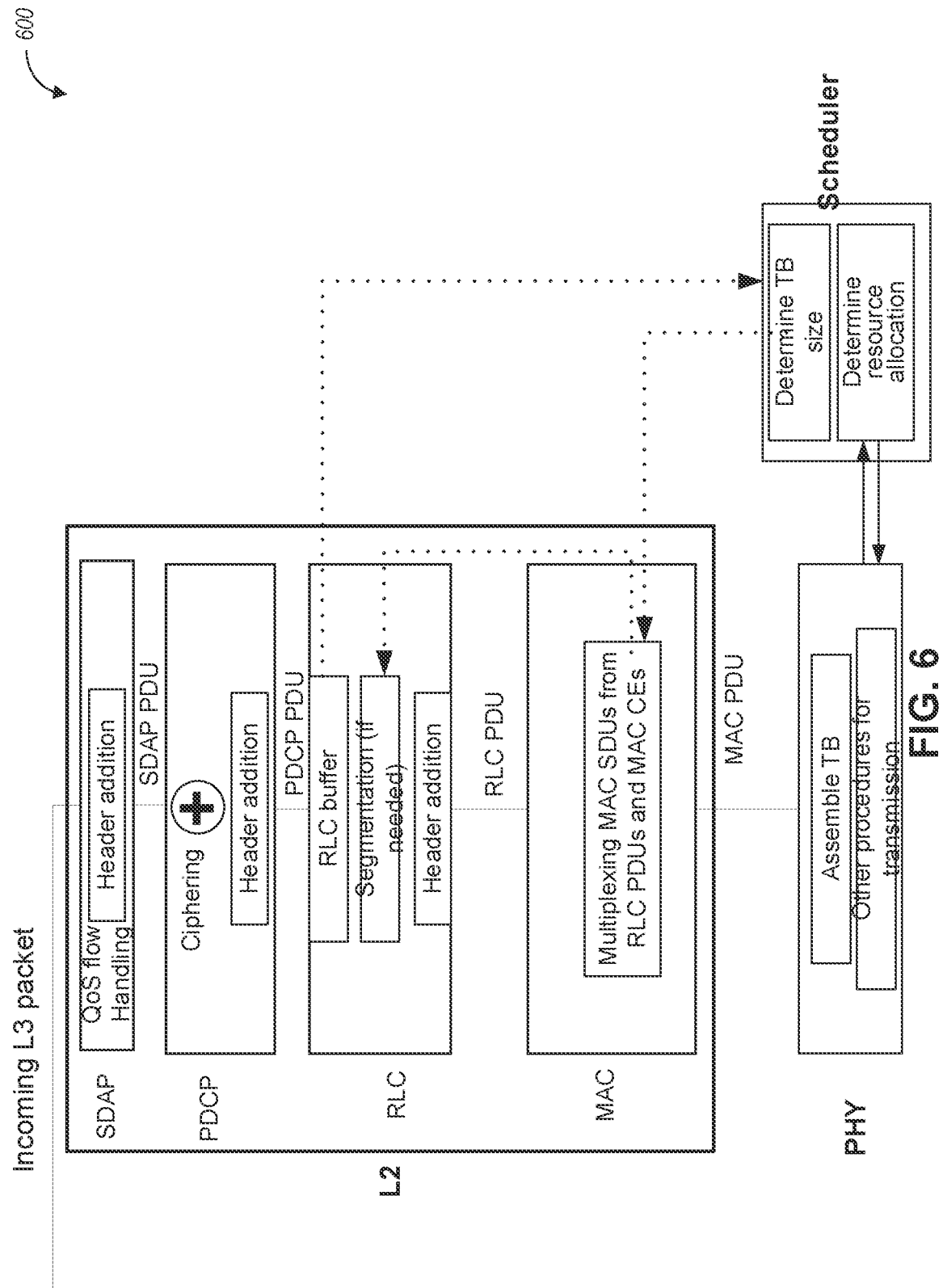
FIG. 6 illustrates a flow chart of user plane packet processing, according to some example embodiments.

FIG. 6 illustrates a flow chart 600 of user plane packet processing, according to some example embodiments.

As discussed in prior approaches, through some exchange of information between AS and higher layers (e.g., indication of recommended data size from AS layer), it is possible to set higher layer (e.g., L3) expectation of the packet size depending on the radio part (gNB) scheduling criteria/decisions (e.g., time-domain allocation, TBS, etc.). This enables alignment of the higher-layer packet size within one TTI and helps to reduce the latency. Such constraint on data size is mainly due to slot boundary and the need to fit a TB into a slot boundary (under a certain available bandwidth) (as well as the potential constraints imposed by the underlying TDD configuration).

In some embodiments, under slot-less operation, one TB can be mapped to a flexible number of symbols (which may span across multiple slots or only span over partial slots containing an arbitrary number of symbols). If all scheduling decisions are still made by the gNB, the gNB may need to determine the transmission duration and the number of physical resources to allocate even in slot-less operation.

Figure 7:
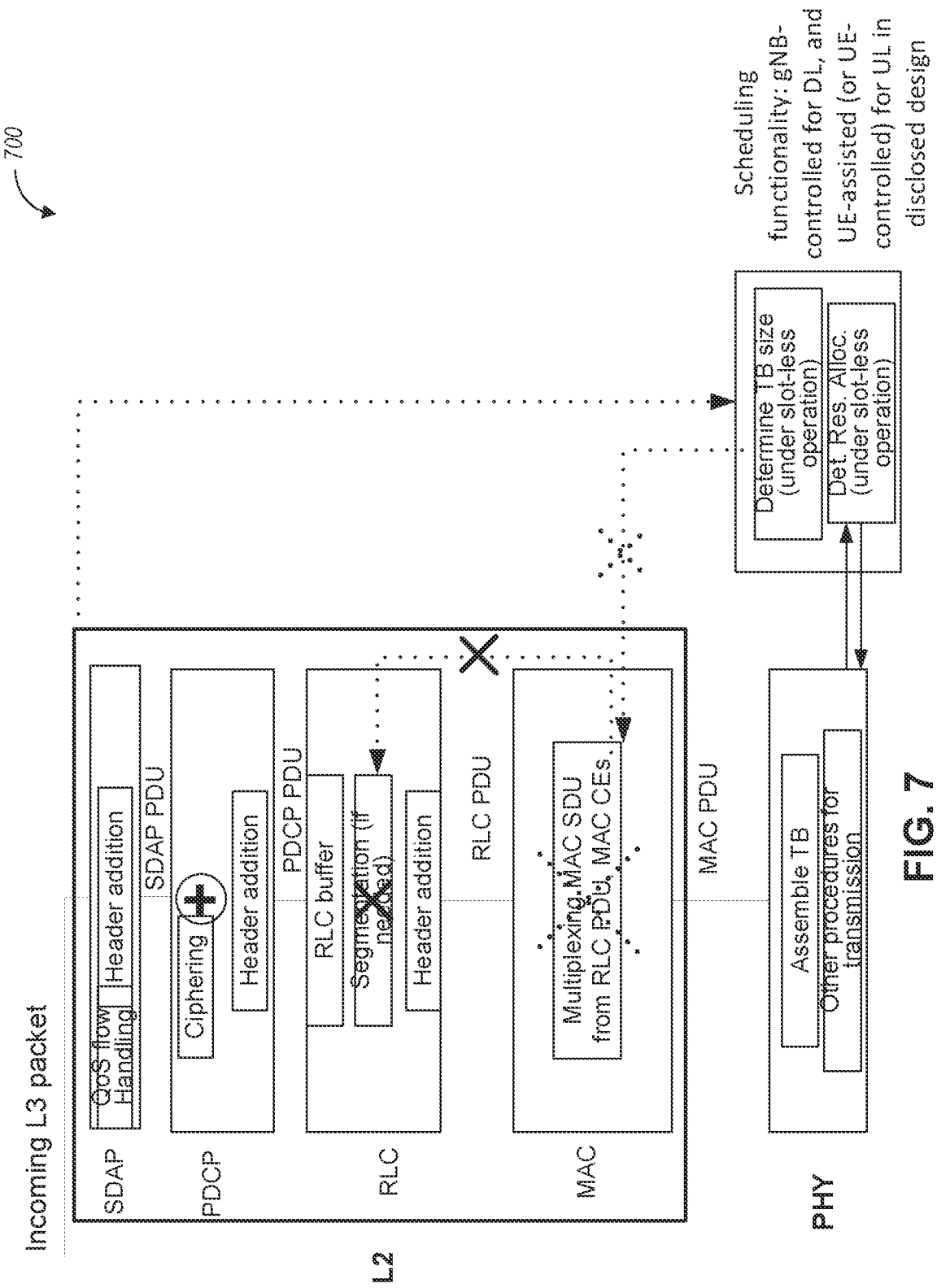
FIG. 7 illustrates a flow chart of streamlined protocol stack processing, according to some example embodiments.

However, considering Approach 3, especially in combination with slot-less operation, in one embodiment, in some embodiments, the UE (with low-latency traffic) is provided with some degrees of freedom to decide and indicate its resource usage for UL transmission (or in some cases indicate some information based on which the resource allocation decisions can be made), to enable fitting one higher layer packet into one TTI (as seen in FIG. 7).

FIG. 7 illustrates a flow chart 700 of streamlined protocol stack processing, according to some example embodiments. More specifically, the streamlined protocol stack processing includes one L3 packet that fits into one TB (e.g., via slot-less design). Entities with crosses in FIG. 7 can be bypassed in the streamlined processing. About the streamlined processing, there can be a one-to-one mapping of protocol layers' packets, by mapping the L3 packet to a single SDAP, PDCP, and RLC PDU, then to one (or multiple) MAC PDU(s) (assuming CB-level feedback), and the transmission can then take place over one TTI. Considering the case with only one RLC PDU per MAC PDU, the MAC layer itself can also be transparent.

In some embodiments, the UE's AS layers receive a packet (e.g., from upper layers). The AS layers may determine that the packet will not fit into a UL grant that the UE has available. In some embodiments, the UE may not perform segmentation and, instead, the transport block is constructed as if the entire packet will fit into the UL grant.

Consequently, the UE may take some actions (e.g., perform communications) in terms of providing some information to the gNB, to handle this aspect. Aspects with respect to the coordination between the UE and gNB to accommodate one higher layer packet into one TTI, are discussed next.

(E.2.a) Coordination Between UE and gNB (What Information and how to be Coordinated): PHY-Layer Signaling on UL Resource Utilization and Adjustments to UE Traffic There are multiple ways for the UE to provide information regarding the L3 packet size and/or required physical resources for UL transmission, to gNB.

In one embodiment, when the UE does not perform segmentation and the transport block is constructed as if the entire packet will fit into the UL grant, the UE may construct a UL control signal (e.g., in PUCCH or UCI transmission in PUSCH). For example, the control signal from the UE can indicate whether the current resource allocation should be extended or not.

In some embodiments, the control signal indicates the extension (in a number of symbols) of the UE's transmission beyond the slot boundary (e.g., frequency resources for the extension can be assumed to be the same as those indicated in the UL grant). Sufficient frequency of PUCCH resources can be assumed.

In some embodiments, the UE may transmit the control signal and the PUSCH, where the PUCCH resources may overlap the PUSCH resources in the time domain (with the PUCCH transmission occurring within the duration of the original grant). In one example, the UL signaling (e.g., PUCCH transmission or UCI transmission in PUSCH) is allowed at the beginning of the slot/UL transmission (to carry the UL indication to the network on the number of physical resources the UE needs to fit UL transmission in one TTI).

In another embodiment, some UL signaling may be considered to enable indication of the end of the transmission/TTI. In NR, once the gNB allocates certain resources for UL CG, the UE either fully uses the resource or skips the UL grant. In some embodiments, following flexible slot (slot-less operation) and transmission duration, the UE may not use some of the symbols from the resource pool if the actual data transmission duration is shorter than allocated resources in the pool. Particularly, the gNB may configure resources to the UE to accommodate a maximum L3 packet size. If the actual L3 packet requires TBS smaller than allocated UL resources in the pool, the UE then only uses a subset of resources. For such cases, some signaling can be considered to indicate UE's end of transmission. With this approach, from the system perspective, (inter-cell) interference can be reduced although its remaining reserved resources may not be used by another UE within the cell.

In yet another embodiment, an indication from the UE can be considered for informing the gNB that UE cannot finish transmission within a slot or a certain number of symbols, for further network handling.

In principle, such procedures/mechanisms may be thought of as "puncturing by the UE". Whether or not such indications need an explicit acknowledgment from the gNB (e.g., to confirm that the UE can extend its transmission, etc.), depends on several factors, including the scheduling processing time, etc. Particularly, since the UL resources are allocated by the gNB, in case the UE extends its transmission (essentially puncturing), whether the gNB needs to explicitly acknowledge it, needs to be taken into account. Accordingly, means for canceling the other UE/UEs UL transmission may be used, as the gNB does not know in advance that it needs to perform the cancellation of other UE transmissions, etc.

There are also considerations with respect to the gNB scheduling processing time. For example, the scheduling processing may be fast, as the gNB receives indication within the transmission that needs to be extended. Considering the required time to also indicate to the UE whether such extension is approved or not, advanced scheduling/processing techniques may be required (to accommodate communications between the UE and gNB). As such, prior exchange of information which enables proper resource allocation in the first place may be preferred over this approach. On the other hand, contention-based methods may in general relax the constraints imposed by the conventional procedure of resource allocation as well as requiring adjustments/confirmation from the gNB side (as the gNB still has control over UE's transmissions). Such aspects will be discussed and disclosed herein below.

In one embodiment, depending on the scheduling processing latency, it may also be possible that during a UL transmission, the UE embeds some indication (e.g., uplink control information (UCI) in PUSCH) to indicate its need for more resources (within the next slot in slot-based operation, or more symbols for current transmission in slot-less operation), to accommodate its L3 packet within one TTI.

In one embodiment, the UE may indicate some information on its expected traffic pattern to the network. In one example, the UE may indicate information about its expected higher layer packet size to the network. In another example, the UE may indicate some information with respect to the physical resources, the TBS, the number of symbols (in case the MCS and frequency resources are known to the UE), etc., to fit one L3 packet into one transmission/TTI.

In some embodiments, some of the resource allocation information may be semi-statically configured by the gNB, similar to SPS/CG schemes, and the UE may indicate further information based on this configuration, and its knowledge about the traffic pattern and/or the expected higher layer packet size, etc.

In case of no prior knowledge at the UE (e.g., no semi-static configuration in support of more dynamic resource utilization), the UE may only indicate information about its expected higher layer packet size, and the gNB determines the number of physical resources (e.g., the number of symbols for a given number of PRBs, etc.) that it requires to fit one L3 packet into one transmission/TTI.

In some embodiments, the UE's information about UL resources may be carried in a "UE assistance information" package (e.g., a radio resource control (RRC) message), similar to power-saving design where a UE can provide its preference on various aspects (e.g., transition out of RRC_CONNECTED into RRC_INACTIVE/IDLE), DRX parameters, the maximum number of MIMO layers, maximum aggregated bandwidth, the maximum number of secondary CCs, and minimum scheduling offset for cross-slot scheduling). Accordingly, it may be possible to add an entry to initiate/request the slot-less operation along with the necessary information from UE on the UL transmission.

Resource Pool for UL Transmission

In one embodiment, the gNB may configure the UE with a resource pool, and the UE may indicate how exactly it uses resources from the resource pool, through UL signaling.

Such an approach assumes UE's knowledge of its transmission duration ahead of time, which can be feasible given that UE is aware of its UL traffic (similar to how gNB schedules its traffic in DL).

Handling/coordinating multiple UEs traffic: In one embodiment, the gNB can allocate orthogonal resources (within resource pools) to different UEs. While UEs can select and optimize within their allocated resource pools (e.g., a UE may only use a subset of its allocated resources), their transmission, and also the number of served UEs within the cell, may not exceed those resources to avoid collision amongst UEs. As such, no contention may be expected between UEs to transmit in certain resources.

In one example, depending on the UEs' indication (e.g., BSR, etc.), the resource pool allocation can be varying. For example, one UE may be allocated with N symbols and another with N/2 symbols, with certain BWs, and within those sets of symbols, the UEs can utilize a subset. In general, relying on BSR/SR may introduce long delays not suitable for URLLC traffic. However, it may be possible to only use this information for refinement of the resource pool at certain times, and not rely on this information for every individual UL transmission.

It is noted that some communication schemes may result in resource inefficiency, because a UE may only use a subset of its dedicated resources. On the other hand, depending on the resource usage ratio and the gNB/UE processing time, if there are resources left, the gNB may issue a UL grant to another UE to use the leftover resource. Also as discussed before, system efficiency is not the primary design target/concern for latency-critical traffic. Nevertheless, in some embodiments, contention-based transmissions may be used to help with avoiding the scheduling processing latency to some extent, while also achieving a better system efficiency.

Considerations from/with Respect to UL CG Transmission

In case of no indication/information from the UE, if the UE follows pre-allocated resources by the network, the resulting operation would be similar to the conventional UL CG.

In some embodiments, for UL CG transmission (under slot-less or slot-based operation), to fit an L3 packet into one TTI transmission, a gNB may have some knowledge of the IP packet size. More accurately, if IP packet size is known by the gNB and is small enough such that the gNB can adjust CG resource allocation to fit the IP packet into one CG UL transmission (one TTI), then NR UL CG equivalently serves the purpose of this design. The actual limitation comes into play when IP packet size is not known or when the IP packet size is large and exceeds slot boundary. In such cases, while the gNB can still allocate CG, but the original slot-based CG may not perform sufficiently well. Accordingly, in one embodiment, a UE-assisted (i.e., the UE provides information about max/expected L3 packet size to the gNB) CG (e.g., configured resource pool) operation under slot-less transmission scheme may be considered. For example, the gNB may configure a resource pool containing N (>14) symbols to a UE, which enables the UE to transmit UL in one TTI with no slot boundary/slot structure. Such transmission can be performed faster than slot-based operation, as the entire L3 packet can fit into those N symbols considered for one-shot transmission.

Further, in the disclosed design, similar to URLLC UL CG, as long as enough resources (resource pools) with short enough periodicity are (pre-)allocated, latency would not be compromised. For normal non-latency sensitive traffic, an orthogonal larger number of symbols as enabled by slot-less transmission duration can be considered within the resource pools (if such scheme is also supported for normal traffic) or can be directly allocated to UE. On the other hand, for low-latency traffic, more frequent (shorter periodicities) and potentially shorter duration (fewer number of symbols for one UL transmission), may be allocated within resource pools, to address latency-critical traffic requirements.

(E.2.b) Contention-Based Slot-Less UL Transmission

Whether or not UE's indications to adjust the UL resources and accommodate L3 packet into one TTI need an explicit acknowledgment from the gNB (e.g., to confirm that the UE can extend its transmission, etc.), depends on several factors, and may be challenging (especially given the low-latency requirements).

Contention-based methods may in general relax the constraints imposed by the conventional procedure of resource allocation as well as requiring adjustments/confirmation from the gNB side. Such methods also offer better UL resource utilization amongst UEs.

In one embodiment, contention-based Scheduling Request (SR) (e.g., in PUCCH) is considered, such that:
(a) (Small) resource for contention-based SR is provided very frequently and such a transmission may be short (e.g., one symbol);
(b) It indicates the UE identity and the packet size UE wants to transmit; and
(c) The gNB allocates UL grants customized to this size.

Such an approach strikes a balance between the resources used for SR and the latency in requesting resources. Overall, this approach avoids going through the BSR process and can introduce much lower latency (compared to the conventional SR/BSR mechanism).

Such mechanism can also be coupled with the uplink procedures disclosed above, e.g., where UE extends its transmission (for example, CB PUCCH is used to indicate extension of grant).

In some embodiments, following a gNB configuration of UL resource pool(s) (and giving the UE some control on its resource usage by selecting from the pool), the resource pool may be generated and configured UE-specifically, potentially based on the UE's feedback/indication on its estimated packets size. For example, a UE can indicate its statistically expected L3 packet size to the gNB (this indication may take place over dedicated resources), so that the gNB can properly populate the resources in the resource pool for UL transmission. Alternatively, the resource pool may be generated and configured for a group of UEs.

If the resource pool contains orthogonal resources across UEs (e.g., over time, frequency, and/or code domain), no contention may be expected between the UEs. In some aspects, only partial orthogonality can be maintained in the code domain in multipath channels, so there will be still some interference between UEs in Code-Division Multiplexing (CDM).

In this regard, it is noted that CDMA has a natural advantage of lower latency since the transmissions are orthogonal in the code domain. As such, there is less need to sequence transmissions in time.

If the resource pool contains non-orthogonal resources across UEs (e.g., for more efficient resources utilization), the UEs may need to contend to obtain the resources. For example, each UE may sense the channel and upon availability transmit its UL data.

In one embodiment, the resource pool(s) may be configured dynamically via DCI (especially if the resources population is based on UE(s) indication of the expected packet size(s)). Alternatively, the resource pool(s) may be configured semi-statically through RRC signaling. For example, a set of contention-based resources can be pre-configured (e.g., by RRC), and UEs contend on these shared UL resources.

Considerations on Latency in Contention-Based Schemes

In some embodiments, contention-based slot-less UL transmission is desirable from the system efficiency point of view. But more importantly, the latency gains from this approach are multi-fold. On the one hand, the UE-assisted slot-less operation enables the alignment of an L3 packet within one TTI and streamlining the processing across protocol stack layers. At the same time, it enables avoiding PDCCH processing overhead/latency, as the contention-based resources can be pre-configured (not DCI-based). Further, acknowledgments/confirmations from the gNB for the UE to extend its UL transmission resources may be relaxed to some extent, etc.

On the other hand, contention-based solutions may require further considerations with respect to other potential sources of latency. Depending on the selected/assumed contention methodology, two sources of delay may contribute to the incurred latency. One is due to the potential channel sensing and acquiring the channel/transmission resources, and the other one is due to the potential collision between the UEs and the resulting back-off for transmission at a later time. For example, in one contention methodology, the channel is assumed available at the UE if no activity (transmission) is sensed/measured by the UE for a certain duration. In another example, the gNB may advertise the channel availability (based on its measurement). Based on the exact design and parametrization of the measurement, contention window, back-off window, etc., some particular methods of contention may be preferred from the latency perspective.

Further, depending on the number of contending UEs, the incurred latency may vary. For example, for a large number of UEs, collisions may happen more frequently (the back-off window may also increase) and the impact on latency may be more severe.

On the other hand, in case of a collision between UEs, likely, collision will not occur on all the transmission symbols and it may cause a reduced number of issues compared to the slot-based operation. For example, if two devices try to transmit at the same time under slot-less (flexible TTI) operation, the collision may not happen throughout their entire transmissions. Depending on how the data is mapped into the resources, UEs might be able to recover from the collision.

(E.2.c) Considerations with Respect to Flexible Slots

While the slot-less operation bypasses the constraint on transmission duration imposed by slot boundary, there may be limitations from the link direction in TDD configurations that needs to be addressed. NR offers flexible TDD configurations at both symbol and slot levels. Considering the transmission over flexible slots (containing both UL and DL symbols) and flexible symbols, aspects such as whether to limit the UL transmission to one contiguous set of UL symbols, or whether to allow breaking and continuing the UL transmission after the DL symbols, may be considered.

NR may allow the realization of dynamic TDD configuration using a combination of NR semi-static configuration via Slot Frame Indicator (SFI) and dynamic scheduling decision (i.e., DCI indication). Particularly. SFI may be used for indicating a super-set of symbols in a slot as semi-static flexible symbols, and the UE may rely on dynamic scheduling DCI to determine the link directions by overwriting the flexible symbols. Such flexibility may only be provided through UE-specific signaling. The semi-static flexible symbols do not impose additional scheduling constraints and may be utilized flexibly by CG UL, for PDCCH monitoring, etc.

In one embodiment, a similar approach may be leveraged to accommodate the UL transmission and ensure the availability of the required UL resources for the UE, considering flexible TDD configurations.

However, there are considerations to take into account. For example, with UE-assisted UL resource allocation, whether and to what extent it is desired to make UE's decision dependent on DCI indication, may be considered. In aspects when the main consideration is latency reduction, making the UE's decision dependent on DCI, may defeat the purpose, at least to some extent. Furthermore, the major benefit offered by the slot-less operation comes from the dynamic/flexible nature of transmission configuration. The semi-static configuration of flexible symbols via SFI may reduce such benefit, e.g., depending on the size of the symbols' super-set, etc.

To address such concerns, in one embodiment, the UE can have enough control to override the semi-static configuration upon its need for more UL resources (preferably without relying on DCI), to make the applicability of the flexible TDD configuration more feasible. In another embodiment, full-duplex transmission can be enabled at BS to allow for multiplexing DL and UL traffics at the same time.

(E.3) DL Transmission

For DL, since both the scheduling decisions and the transmission are performed by the gNB, the gNB can adjust the TBS and physical resources to accommodate the higher layer's packet (L3 packet) into one TTI (e.g., as illustrated in FIG. 7). In some embodiments, the slot-less approach enables overcoming the slot boundary constraint to fit one L3 packet into one TT in the DL direction. On the other hand, flexible slots (with both DL and UL symbols), may not impose many constraints on DL transmission, since the gNB is in full control of TDD configuration and overriding the semi-static SFI configuration, whenever needed.

For downlink transmission, in one embodiment, the transport block size is determined at the gNB. For example, the gNB determines that the TBS is larger than what can be accommodated in one slot.

In some embodiments, resources are allocated by the gNB that may span multiple (conventional) slots.

How to Signal (e.g., in PDCCH) that the Transmission Spans Multiple Slots

In one embodiment, the gNB transmits a PDCCH that indicates the symbols used across the slots (under slot-less/flexible slot operation) for the PDSCH. For example, this can be achieved by including a bitmap of length n×k, where n is the maximum number of slots and k is the number of symbols per slot. In another example, considering scheduling over consecutive symbols, the bitmap approach can be simplified to optimized the control signaling overhead.

In some embodiments associated with NR communications, to indicate the PDSCH time domain resource allocation, the concept of SLIV (the Start and Length Indicator Value) is used. One of the differences between LTE and NR scheduling is that NR schedules not only for a slot but also the symbols within the scheduled slot, whereas in LTE the schedule is done only for subframe level (not for the symbol levels within the scheduled subframe). In some embodiments, SLIV defines the start symbol and the number of consecutive symbols for PDSCH allocation using a single number, according to a specific rule defined in 3GPP TS 38.214 subclause 5.1.2.1.

In one embodiment, for slot-less (e.g., flexible TTI duration) operation, the concept of SLIV is extended compared to NR. For example, the duration, i.e., L in SLIV, may take values beyond 14 (potentially up to a certain threshold, e.g., M×14, where M can be 2, 3, 4, etc.). In another example, L can still be limited to 14, and it can indicate the number of symbols in the last scheduled slot, while it can be assumed that in any prior scheduled slot (potentially except for the first slot), all available symbols are occupied. As such, the S value in SLIV should be extended compared to NR, to indicate the beginning of the extended allocation, which can be in one of the earlier slots. Alternatively, further parameter(s) can be added to the concept of SLIV, to indicate a third dimension, etc. For example, considering consecutive scheduled symbols, the number of scheduled slots in between the S and L can be indicated.

How ACK/NACK Works Given that the Transmission Spans Multiple Slots

In one embodiment, the gNB expects an ACK/NACK in a resource in symbol N+L, where N is the last symbol of the PDSCH transmission and L is at least N2 (the minimum duration for ACK/NACK). Specific mapping of the PDSCH to ACK/NACK may depend on UL/DL symbols across the slots. In some embodiments, given the focus of some disclosed techniques on achieving very low latency, e.g., by avoiding segmentation, the one-shot transmission may also be considered as the main mode of operation in this context.

A system and method of wireless communication for streamlined transmission of low latency data across the protocol layers is disclosed, involving transmission of one higher-layer packet into one TTI, such that segmentation of PDCP SDU (L3 packet) is avoided, and one higher-layer data (L3 packet) is transmitted in one shot/TTI.

In some embodiments, a one-to-one mapping of protocol layers' packets may be used, by mapping the L3 packet to a single PDCP PDU, then to a single RLC PDU, then to one or multiple MAC PDU(s) (assuming CB-level feedback), and then transmit it over one TTI.

In some embodiments, the upper-layer (L3) packet size is designed/selected based on PHY resource allocation (e.g., through some exchange of information between AS and higher layers, in coordination with PHY TBS, etc.), to ensure fitting one higher layer packet into one TTI. The upper-layer packet size selection/adjustment can be performed semi-statically (e.g., by fixed/pre-defined/pre-configured packet or TBS size(s)), or more dynamically (e.g., through some feedback/indication mechanism from lower layers to the higher layers).

In some embodiments, PHY resources are adjusted based on upper-layer packet size.

In some embodiments, flexible and extended transmission duration is enabled via slot-less (flexible slot/scheduling/TT duration) operation, to allow the AS layer to adapt to the higher-layer packet size and accommodate it within one TTI (without segmentation). Particularly, TTI duration can be dynamically varying/extended depending on the upper-layer packet/PDU (variable) size, to fit it into one TTI.

In some embodiments, for UL transmission, the UE determines or assists the UL resource allocation, through some coordination between UE and gNB (under slot-based or slot-less operation).

In some embodiments, the gNB configures UL resource pool(s) (dynamically or semi-statically, and with orthogonal or non-orthogonal resources across UEs) and the UE has some control over its resource usage by selecting from the pool(s).

In some embodiments, the UEs contend over the resources for UL data transmission and/or SR transmission, to adjust their UL resources to fit an L3 packet into one TTI.

In some embodiments, for DL transmission, the gNB transmits a PDCCH that indicates the symbols used across the slots (under slot-less/flexible slot operation) for the PDSCH. For example, this can be achieved by including a bitmap of length n×k, where n is the max number of slots and k is the number of symbols per slot, or through extensions of the NR SLIV concept for time-domain resource allocation.

In some embodiments, for DL transmission, the gNB expects an ACK/NACK in a resource in symbol N+L, where N is the last symbol of the PDSCH transmission and L is at least N2 (the minimum duration for ACK/NACK). Specific mapping of the PDSCH to ACK/NACK may depend on UL/DL symbols across the slots.

In some embodiments, a method at a UE of receiving data from a base station (e.g., in a DL transmission), includes receiving a control signal in a first slot indicating the resources allocated to transmission of a transport block. The control signal includes an indication that the resource allocation spans more than the one-time slot, the OFDM symbols of the time slots are used for the transmission, and frequency resources are used for the transmission. In some embodiments, the transport block is received during the time slots indicated and transmitting an acknowledgment.

In some embodiments, the acknowledgment is transmitted in a resource that is determined based on the last OFDM symbol comprising the transmission of the transport block.

In some embodiments, a method at a UE of transmitting data to a base station (e.g., in a UL transmission) includes receiving an allocation of a set of frequency resources over the first number of symbols for transmission of a packet. The UE further determines that the packet does not fit into the allocated resource without segmentation. The method also includes constructing and transmitting to the base station a control signal indicating that the UE's transmission extends beyond the allocated first number of symbols by the second number of symbols. The method also includes transmitting the transport block corresponding to the packet using the allocated resources and the extended resources indicated in the control signal.

In some embodiments, the transport block is transmitted in response to receiving an acknowledgment of the control signal.

Example UL Transmission Flow 1

In some embodiments, a base station (e.g., collectively referred to as an xNB which can include a gNB, eNB, or another type of NB) generates and (pre-)configures (e.g., dynamically or semi-statically) (a pool of) extended UL resources for multiple UEs or a specific UE, possibly based on some UE(s) indication on average expected/estimated higher-layer packet size(s), or based on overall received enhanced-BSR(s), or based on the maximum expected higher-layer packet size.

In some embodiments, the size of the resource pool may be adjusted semi-dynamically or semi-statically.

In some embodiments, the xNB can allocate orthogonal resources (within resource pools) to different UEs which allows contention-free UL transmission, or it may be allocated non-orthogonal resources which require contention-based UL transmission.

In some embodiments, UL data from higher layers (e.g., application layer) enters the UE buffer (UE's AS layers receive a packet (from upper layers)).

In some embodiments, the UE transmits data using resources from the pool (possibly beyond conventional slot boundaries. UE's transmission may or may not override flexible TDD configuration. e.g., indicated by DCI.)

In some embodiments, if the resource pool is configured for contention-based transmission, the UE performs this step, only if it can successfully obtain the resources. In some embodiments, if the UE's transmission uses a subset of the available resources in the pool, UE may release the rest of the resources. For example, UE may indicate the (expected) end of its transmission.

In some embodiments, the UE may indicate information on the number of resources it uses beyond the conventional slot boundaries for its transmission. In some embodiments, the UE may prioritize using any already available UE granted resources, before using resources from the pool. In some embodiments, the UE may indicate such behavior to the scheduler. In some embodiments, the UE may transmit any such (above) information using UCI transmitted via PUSCH or PUCCH Example UL Transmission Flow 2

In some embodiments, an xNB (pre-)configures (a pool of) resources for enhanced contention-based SR. In some embodiments, UL data from higher layers (e.g., application layer) enters the UE buffer. In some embodiments, if the UE acquires access to resources, the UE transmits enhanced SR (possibly together with higher-layer packet size).

In some embodiments, xNB configurations include:

Option 1: UL grant customized for the expected packet size, where the granted resources may span beyond conventional slot boundaries.

Option 2: (pool of) extended UL resources for multiple UEs or UE-specifically.

In some embodiments, the UE transmits data over the granted resources, or the UE may transmit using resources of the configured pool (as per Example Flow 1 above).

Example DL Transmission Flow

Figure 8:
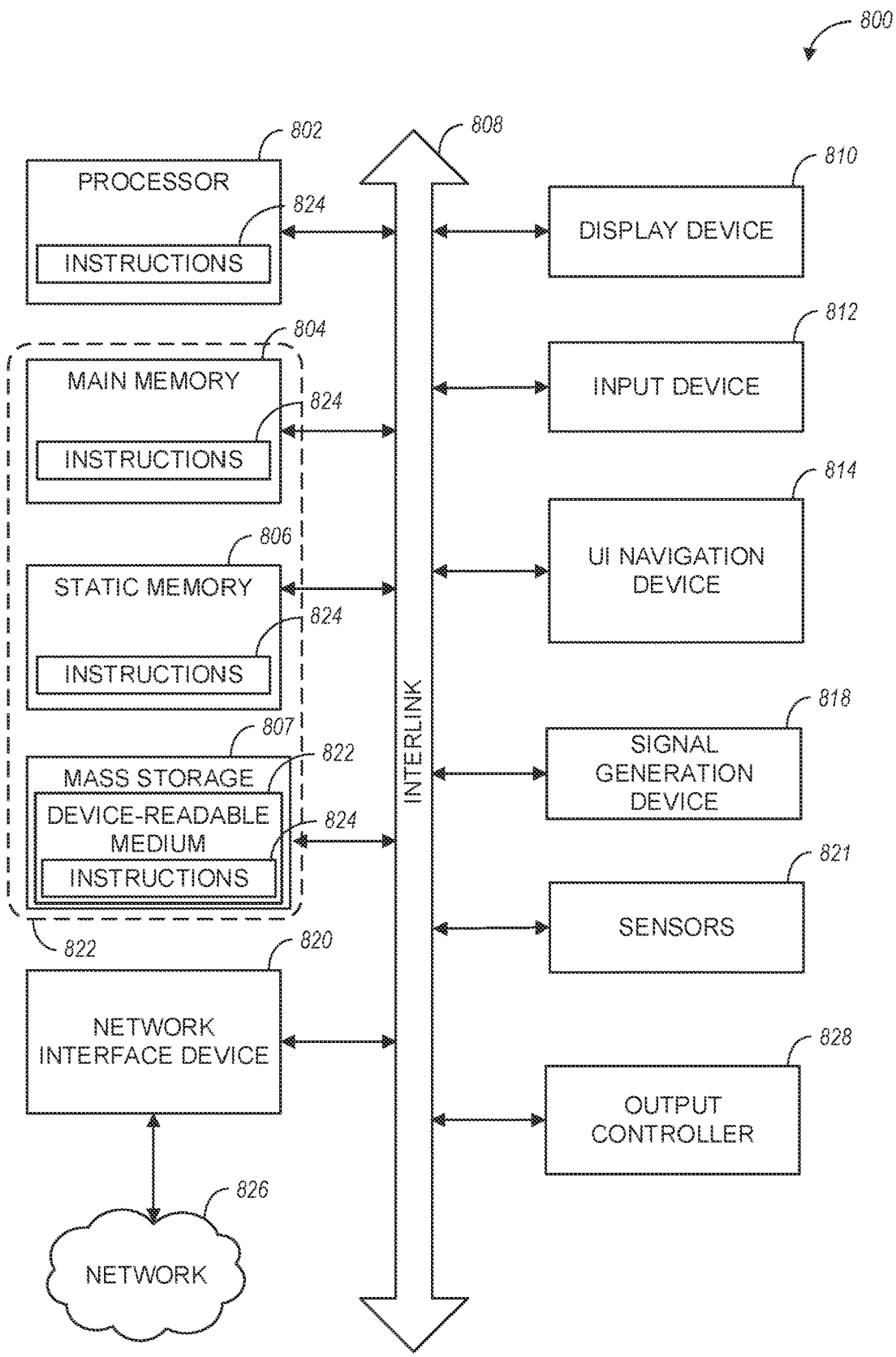
FIG. 8 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects.

In some embodiments, an xNB schedules DL transmission via DCI. In some embodiments, DL resources may span across slot boundaries. In some embodiments, the xNB may indicate the extended DL resources, using an enhanced version of SLIV. In some embodiments, the UE receives DL control followed by DL data over the indicated resources FIG. 8 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects and to perform one or more of the techniques disclosed herein. In alternative aspects, the communication device 800 may operate as a standalone device or may be connected (e.g., networked) to other communication devices.

Circuitry (e.g., processing circuitry) is a collection of circuits implemented in tangible entities of the device 800 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 800 follow.

In some aspects, the device 800 may operate as a standalone device or may be connected (e.g., networked) to other devices. In a networked deployment, the communication device 800 may operate in the capacity of a server communication device, a client communication device, or both in server-client network environments. In an example, the communication device 800 may act as a peer communication device in a peer-to-peer (P2P) (or other distributed) network environment. The communication device 800 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 800 may include a hardware processor 802 (e.g., a central processing unit (CPU), a graphics processing unit (GPU), a hardware processor core, or any combination thereof), a main memory 804, a static memory 806, and a storage device 807 (e.g., hard drive, tape drive, flash storage, or other block or storage devices), some or all of which may communicate with each other via an interlink (e.g., bus) 808.

The communication device 800 may further include a display device 810, an alphanumeric input device 812 (e.g., a keyboard), and a user interface (UI) navigation device 814 (e.g., a mouse). In an example, the display device 810, input device 812, and UI navigation device 814 may be a touchscreen display. The communication device 800 may additionally include a signal generation device 818 (e.g., a speaker), a network interface device 820, and one or more sensors 821, such as a global positioning system (GPS) sensor, compass, accelerometer, or another sensor. The communication device 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 807 may include a communication device-readable medium 822, on which is stored one or more sets of data structures or instructions 824 (e.g., software) embodying or utilized by any one or more of the techniques or functions described herein. In some aspects, registers of the processor 802, the main memory 804, the static memory 806, and/or the storage device 807 may be, or include (completely or at least partially), the device-readable medium 822, on which is stored the one or more sets of data structures or instructions 824, embodying or utilized by any one or more of the techniques or functions described herein. In an example, one or any combination of the hardware processor 802, the main memory 804, the static memory 806, or the mass storage 816 may constitute the device-readable medium 822.

As used herein, the term "device-readable medium" is interchangeable with "computer-readable medium" or "machine-readable medium". While the communication device-readable medium 822 is illustrated as a single medium, the term "communication device-readable medium" may include a single medium or multiple media (e.g., a centralized or distributed database, and/or associated caches and servers) configured to store the one or more instructions 824. The term "communication device-readable medium" is inclusive of the terms "machine-readable medium" or "computer-readable medium", and may include any medium that is capable of storing, encoding, or carrying instructions (e.g., instructions 824) for execution by the communication device 800 and that causes the communication device 800 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 824 may further be transmitted or received over a communications network 826 using a transmission medium via the network interface device 820 utilizing any one of a number of transfer protocols. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input-multiple-output (SIMO), MIMO, or multiple-input-single-output (MISO) techniques. In some examples, the network interface device 820 may wirelessly communicate using Multiple User MIMO techniques.

The term "transmission medium" shall be taken to include any intangible medium that is capable of storing, encoding, or carrying instructions for execution by the communication device 800, and includes digital or analog communications signals or another intangible medium to facilitate communication of such software. In this regard, a transmission medium in the context of this disclosure is a device-readable medium.

EXAMPLE ASPECTS

The following are some additional example aspects associated with the disclosed techniques and FIGS. 1A-8.

Example 1 is an apparatus for a user equipment (UE) configured for operation in a wireless network, the apparatus comprising: processing circuitry, wherein to configure the UE for a streamlined transmission during low latency communications in the wireless network, the processing circuitry is to: decode configuration signaling received from a base station, the configuration signaling to configure scheduling request (SR) occasions for the UE; detect availability of an uplink (UL) data packet from an application layer, a size of the UL data packet being higher than a size of a transmission time interval (TTI) associated with a pre-defined slot boundary; encode an SR for transmission to the base station during one of the SR occasions, the SR including an indication based on the size of the UL data packet; decode control information from the base station in response to the SR, the control information including a scheduling grant based on the size of the UL data packet; and encode the UL data packet for transmission using the scheduling grant; and a memory coupled to the processing circuitry and configured to store the UL data packet and the control information.

In Example 2, the subject matter of Example 1 includes subject matter where the indication provides the size of the UL data packet or a size of a portion of the UL data packet that extends beyond the pre-defined slot boundary of the TTI.

In Example 3, the subject matter of Examples 1-2 includes subject matter where the processing circuitry is configured to: encode uplink control information (UCI) for transmission to the base station using a physical uplink shared channel (PUSCH) or a physical uplink control channel (PUCCH), the UCI including the indication based on the size of the UL data packet.

In Example 4, the subject matter of Examples 1-3 includes subject matter where the scheduling grant configures a pool of extended UL resources configured for the UE and at least a second UE. In some embodiments, the pool of extended resources is configured only for the UE.

In Example 5, the subject matter of Example 4 includes subject matter where the processing circuitry is configured to encode the UL data packet for transmission using the extended UL resources from the pool, the extended UL resources spanning beyond the pre-defined slot boundary.

In Example 6, the subject matter of Example 5 includes subject matter where the transmission of the UL data packet overrides a flexible time division duplex (TDD) configuration indicated by downlink control information (DCI).

In Example 7, the subject matter of Examples 4-6 includes subject matter where the processing circuitry is configured to encode the UL data packet for transmission using a portion of the configured pool of extended UL resources configured to the UE.

In Example 8, the subject matter of Example 7 includes subject matter where the processing circuitry is configured to release a remaining portion of the pool of extended UL resources configured to the UE based on the transmission.

In Example 9, the subject matter of Examples 1-8 includes subject matter where the control information further schedules downlink (DL) resources for transmission of DL data by the base station, the DL resources spanning across the pre-defined slot boundary.

In Example 10, the subject matter of Examples 1-9 includes, transceiver circuitry coupled to the processing circuitry; and one or more antennas coupled to the transceiver circuitry.

Example 11 is a non-transitory computer-readable storage medium that stores instructions for execution by one or more processors of user equipment (UE), the instructions to configure the UE for a streamlined transmission during low latency communications in a wireless network and to cause the UE to perform operations comprising: decoding configuration signaling received from a base station, the configuration signaling to configure scheduling request (SR) occasions for the UE; detecting availability of an uplink (UL) data packet from an application layer, a size of the UL data packet being higher than a size of a transmission time interval (TTI) associated with a pre-defined slot boundary, encoding an SR for transmission to the base station during one of the SR occasions, the SR including an indication based on the size of the UL data packet; decoding control information from the base station in response to the SR, the control information including a scheduling grant based on the size of the UL data packet; and encoding the UL data packet for transmission using the scheduling grant.

In Example 12, the subject matter of Example 11 includes subject matter where the indication provides the size of the UL data packet or a size of a portion of the UL data packet that extends beyond the pre-defined slot boundary of the TTI.

In Example 13, the subject matter of Examples 11-12 includes, the operations further comprising: encoding uplink control information (UCI) for transmission to the base station using a physical uplink shared channel (PUSCH) or a physical uplink control channel (PUCCH), the UCI including the indication based on the size of the UL data packet.

In Example 14, the subject matter of Examples 11-13 includes subject matter where the scheduling grant configures a pool of extended UL resources configured for the UE and at least a second UE.

In Example 15, the subject matter of Example 14 includes, the operations further comprising: encoding the UL data packet for transmission using the extended UL resources from the pool, the extended UL resources spanning beyond the pre-defined slot boundary.

In Example 16, the subject matter of Example 15 includes subject matter where the transmission of the UL data packet overrides a flexible time division duplex (TDD) configuration indicated by downlink control information (DCI).

In Example 17, the subject matter of Examples 14-16 includes, the operations further comprising: encoding the UL data packet for transmission using a portion of the configured pool of extended UL resources configured to the UE.

In Example 18, the subject matter of Example 17 includes, the operations further comprising: releasing a remaining portion of the pool of extended UL resources configured to the UE based on the transmission.

Example 19 is a non-transitory computer-readable storage medium that stores instructions for execution by one or more processors of a base station, the instructions to configure the base station for a streamlined transmission during low latency communications in a wireless network and to cause the base station to perform operations comprising: encoding configuration signaling for transmission to user equipment (UE), the configuration signaling to configure scheduling request (SR) occasions for the UE; decoding an SR from the UE, the SR including an indication based on a size of an uplink (UL) data packet being higher than a size of a transmission time interval (TTI) associated with a pre-defined slot boundary; encoding control information for transmission to the UE in response to the SR, the control information including a scheduling grant based on the size of the UL data packet; and decoding the UL data packet received based on the scheduling grant.

In Example 20, the subject matter of Example 19 includes, the operations further comprising: decoding uplink control information (UCI) received from the UE using a physical uplink shared channel (PUSCH) or a physical uplink control channel (PUCCH), the UCI including the indication based on the size of the UL data packet.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE) configured for operation in a wireless network, the apparatus comprising:
   processing circuitry, wherein to configure the UE for a streamlined transmission during low latency communications in the wireless network, the processing circuitry is to:
   decode configuration signaling received from a base station, the configuration signaling to configure scheduling request (SR) occasions for the UE;
   detect availability of an uplink (UL) data packet from an application layer, a size of the UL data packet being higher than a size of a transmission time interval (TTI) associated with a pre-defined slot boundary;
   encode an SR for transmission to the base station during one of the SR occasions, the SR including an indication based on the size of the UL data packet;
   decode control information from the base station in response to the SR, the control information including a scheduling grant based on the size of the UL data packet; and
   encode the UL data packet for transmission using the scheduling grant; and
   a memory coupled to the processing circuitry and configured to store the UL data packet and the control information.

2. The apparatus of claim 1, wherein the indication provides the size of the UL data packet or a size of a portion of the UL data packet that extends beyond the pre-defined slot boundary of the TTI.

3. The apparatus of claim 1, wherein the processing circuitry is configured to:
   encode uplink control information (UCI) for transmission to the base station using a physical uplink shared channel (PUSCH) or a physical uplink control channel (PUCCH), the UCI including the indication based on the size of the UL data packet.

4. The apparatus of claim 1, wherein the scheduling grant configures a pool of extended UL resources configured for the UE and at least a second UE.

5. The apparatus of claim 4, wherein the processing circuitry is configured to:
encode the UL data packet for transmission using the extended UL resources from the pool, the extended UL resources spanning beyond the pre-defined slot boundary.

6. The apparatus of claim 5, wherein the transmission of the UL data packet overrides a flexible time division duplex (TDD) configuration indicated by downlink control information (DCI).

7. The apparatus of claim 4, wherein the processing circuitry is configured to:
encode the UL data packet for transmission using a portion of the configured pool of extended UL resources configured to the UE.

8. The apparatus of claim 7, wherein the processing circuitry is configured to:
release a remaining portion of the pool of extended UL resources configured to the UE based on the transmission.

9. The apparatus of claim 1, wherein the control information further schedules downlink (DL) resources for transmission of DL data by the base station, the DL resources spanning across the pre-defined slot boundary.

10. The apparatus of claim 1, further comprising transceiver circuitry coupled to the processing circuitry; and one or more antennas coupled to the transceiver circuitry.

11. A non-transitory computer-readable storage medium that stores instructions for execution by one or more processors of user equipment (UE), the instructions to configure the UE for a streamlined transmission during low latency communications in a wireless network and to cause the UE to perform operations comprising:
decoding configuration signaling received from a base station, the configuration signaling to configure scheduling request (SR) occasions for the UE;
detecting availability of an uplink (UL) data packet from an application layer, a size of the UL data packet being higher than a size of a transmission time interval (TTI) associated with a pre-defined slot boundary;
encoding an SR for transmission to the base station during one of the SR occasions, the SR including an indication based on the size of the UL data packet;
decoding control information from the base station in response to the SR, the control information including a scheduling grant based on the size of the UL data packet; and
encoding the UL data packet for transmission using the scheduling grant.

12. The non-transitory computer-readable storage medium of claim 11, wherein the indication provides the size of the UL data packet or a size of a portion of the UL data packet that extends beyond the pre-defined slot boundary of the TTI.

13. The non-transitory computer-readable storage medium of claim 11, the operations further comprising:
encoding uplink control information (UCI) for transmission to the base station using a physical uplink shared channel (PUSCH) or a physical uplink control channel (PUCCH), the UCI including the indication based on the size of the UL data packet.

14. The non-transitory computer-readable storage medium of claim 11, wherein the scheduling grant configures a pool of extended UL resources configured for the UE and at least a second UE.

15. The non-transitory computer-readable storage medium of claim 14, the operations further comprising:
encoding the UL data packet for transmission using the extended UL resources from the pool, the extended UL resources spanning beyond the pre-defined slot boundary.

16. The non-transitory computer-readable storage medium of claim 15, wherein the transmission of the UL data packet overrides a flexible time division duplex (TDD) configuration indicated by downlink control information (DCI).

17. The non-transitory computer-readable storage medium of claim 14, the operations further comprising:
encoding the UL data packet for transmission using a portion of the configured pool of extended UL resources configured to the UE.

18. The non-transitory computer-readable storage medium of claim 17, the operations further comprising:
releasing a remaining portion of the pool of extended UL resources configured to the UE based on the transmission.

19. A non-transitory computer-readable storage medium that stores instructions for execution by one or more processors of a base station, the instructions to configure the base station for a streamlined transmission during low latency communications in a wireless network and to cause the base station to perform operations comprising:
encoding configuration signaling for transmission to user equipment (UE), the configuration signaling to configure scheduling request (SR) occasions for the UE;
decoding an SR from the UE, the SR including an indication based on a size of an uplink (UL) data packet being higher than a size of a transmission time interval (TTI) associated with a pre-defined slot boundary;
encoding control information for transmission to the UE in response to the SR, the control information including a scheduling grant based on the size of the UL data packet; and
decoding the UL data packet received based on the scheduling grant.

20. The non-transitory computer-readable storage medium of claim 19, the operations further comprising:
decoding uplink control information (UCI) received from the UE using a physical uplink shared channel (PUSCH) or a physical uplink control channel (PUCCH), the UCI including the indication based on the size of the UL data packet.

* * * * *